United States Patent
Ryu et al.

(10) Patent No.: US 7,571,030 B2
(45) Date of Patent: Aug. 4, 2009

(54) ESTIMATION OF VEHICLE ROLL RATE AND ROLL ANGLE USING SUSPENSION DEFLECTION SENSORS

(75) Inventors: Jihan Ryu, Sterling Heights, MI (US); Shih-Ken Chen, Troy, MI (US); Nikolai K. Moshchuk, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 525 days.

(21) Appl. No.: 11/400,844

(22) Filed: Apr. 10, 2006

(65) Prior Publication Data
US 2007/0239320 A1    Oct. 11, 2007

(51) Int. Cl.
    *G06F 17/00*     (2006.01)
(52) U.S. Cl. .......................... 701/1; 340/440
(58) Field of Classification Search ............ 701/1, 701/37–38; 340/440; 280/5.502, 5.506, 280/5.507
See application file for complete search history.

(56) References Cited

U.S. PATENT DOCUMENTS

| | | | | |
|---|---|---|---|---|
| 5,610,575 A | * | 3/1997 | Gioutsos | 340/429 |
| 5,825,284 A | * | 10/1998 | Dunwoody et al. | 340/440 |
| 5,890,084 A | * | 3/1999 | Halasz et al. | 701/45 |
| 6,002,974 A | | 12/1999 | Schiffmann | |
| 6,631,317 B2 | * | 10/2003 | Lu et al. | 701/45 |
| 6,789,002 B1 | * | 9/2004 | Hac et al. | 701/1 |
| 6,804,584 B2 | | 10/2004 | Tseng et al. | |
| 2003/0055549 A1 | | 3/2003 | Barta et al. | |

* cited by examiner

*Primary Examiner*—Yonel Beaulieu
(74) *Attorney, Agent, or Firm*—John A. Miller; Miller IP Group, PLC

(57) ABSTRACT

A system and method for estimating vehicle roll rate and roll angle. The system includes a suspension deflection sensor provided at each wheel of the vehicle that provides suspension measurement signals indicative of the roll of the vehicle. The system also includes a roll rate estimator that uses the suspension measurement signals and an estimated tire deflection of the wheels to provide a roll rate estimation signal. The system also includes a vehicle roll angle and a roll rate estimator that uses the roll rate estimation signal and a dynamic model to estimate the roll angle and refine the roll rate. The roll rate estimator calculates the roll rate one way if none of the vehicle wheels are off of the ground and calculates it another way if any of the wheels are off of the ground.

20 Claims, 2 Drawing Sheets

ESTIMATION OF VEHICLE ROLL RATE AND ROLL ANGLE USING SUSPENSION DEFLECTION SENSORS

BACKGROUND OF THE INVENTION

1. Field of the Invention

This invention relates generally to a system and method for estimating vehicle roll rate and roll angle and, more particularly, to a system and method for estimating vehicle roll rate and roll angle using vehicle suspension sensors and a 1 degree-of-freedom roll model.

2. Discussion of the Related Art

It is known in the art to detect a potential vehicle rollover using differential braking control, rear-wheel steering control, front-wheel steering control, or any combination thereof. A vehicle roll estimation system may receive vehicle dynamics information from various sensors, such as yaw rate sensors, lateral acceleration sensors and roll rate sensors, to determine the proper amount of action to be taken to detect a potential vehicle rollover. A balance typically needs to be provided between estimating the vehicle roll motion and the vehicle yaw motion to provide the optimal vehicle response. Thus, it is usually necessary to detect certain vehicle conditions to provide the roll detection.

Potential vehicle rollover can be provided to vehicle drivers or can be mitigated by activating adequate chassis control systems with knowledge of vehicle roll stability conditions. Vehicle rollover warning or avoidance systems, therefore, will show satisfactory performance if the roll stability conditions are actively known to the systems. To precisely identify vehicle roll stability conditions, it is advantageous to know the vehicle's roll rate and roll angle since they are the most important states in vehicle roll dynamics.

Several methods have been developed in the art to estimate the roll angle and roll rate information using vehicle sensor measurements. One known technique uses a roll rate sensor together with other vehicle information, such as vehicle speed, steering wheel angle, yaw rate and lateral acceleration, to estimate the roll angle. Another known technique uses a variety of angular rate sensors and accelerometers to estimate the roll angle. All of the known methods require roll rate sensors that can measure the roll rate directly. However, roll rate sensors are not standard vehicle equipment and can be expensive.

SUMMARY OF THE INVENTION

In accordance with the teachings of the present invention, a system and method are disclosed for estimating vehicle roll rate and roll angle. The system includes a suspension deflection sensor provided at each wheel of the vehicle that provides suspension measurement signals indicative of the roll of the vehicle. The system also includes a roll rate estimator that uses the suspension measurement signals and an estimated tire deflection of the wheels to provide a roll rate estimation signal. The system also includes a vehicle roll angle and roll rate estimator that uses the roll rate estimation signal and a 1 degree-of-freedom dynamic model to estimate the roll angle and the roll rate of a vehicle. The roll rate estimator calculates the roll rate one way if none of the vehicle wheels are off of the ground and calculates it another way if any of the wheels are off of the ground.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for estimating vehicle roll angle and roll rate is merely exemplary in nature, and is in no way intended to limit the invention or its applications or uses.

The present invention proposes a system and method for estimating vehicle roll rate and roll angle using suspension information without the need for a dedicated roll rate sensor. Assuming suspension deflection rates are measured at springs or shock absorbers (dampers) of the vehicle, the vehicle roll rate is first calculated using measured suspension deflection rates. The calculated roll rate is then integrated with a 1 degree-of-freedom (DOF) dynamic model of vehicle roll motion. Lateral acceleration measurements are also incorporated into the integration process. The integration process refines the roll rate estimates, and estimates the vehicle roll angle.

Figure 1:
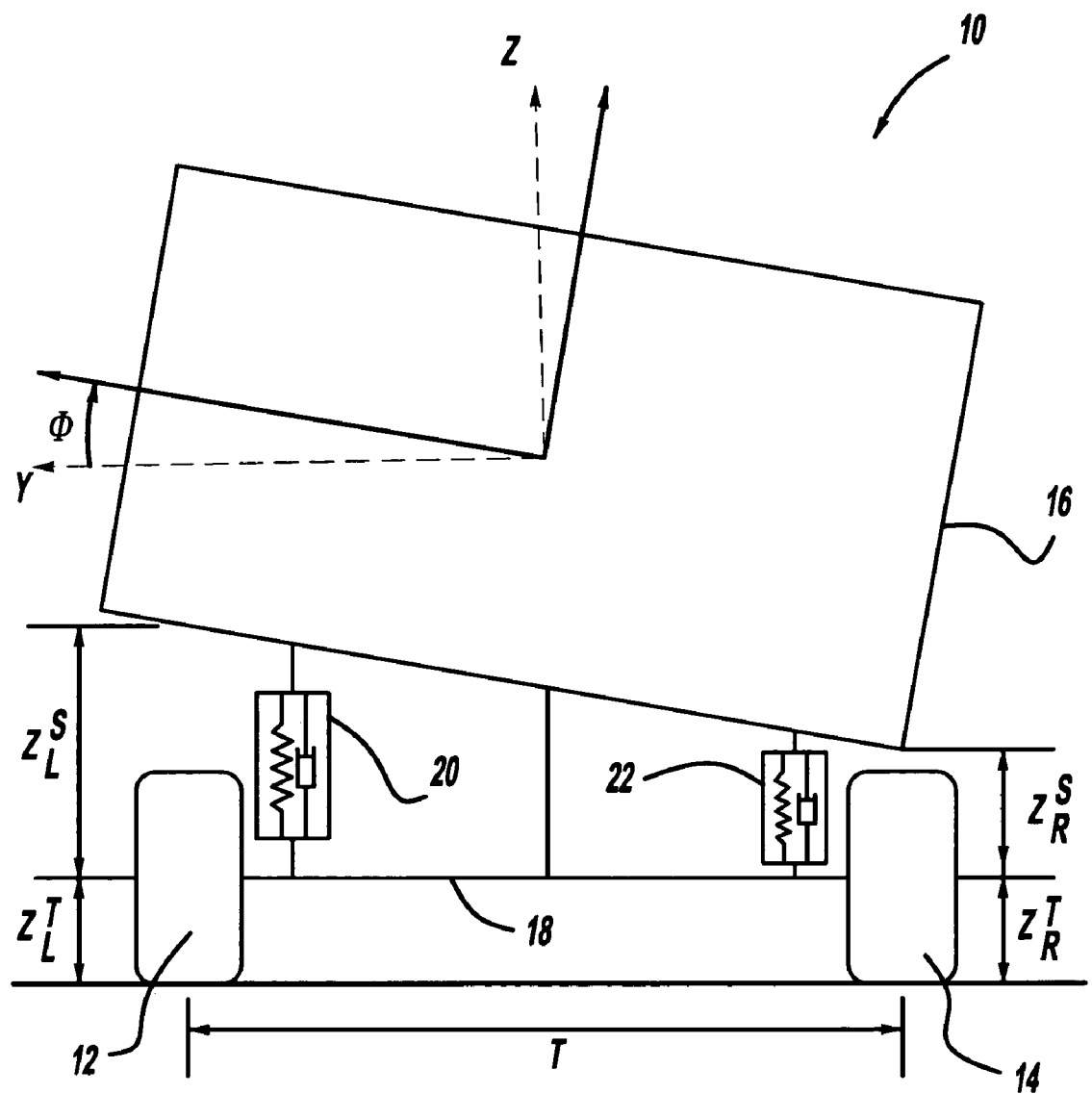
FIG. 1 is a schematic diagram of a vehicle under a roll motion.

FIG. 1 is a schematic diagram showing a rear-view of a vehicle 10 including a vehicle body 16 under a roll motion. A left rear wheel 12 and a right rear wheel 14 may be coupled to an axle 18 of the vehicle 10 as shown. As is well understood in the art, each wheel of a vehicle includes a damper or some shock absorber device between the vehicle suspension and the vehicle body 16. When the vehicle body 16 is in a roll motion, defined by $\phi$, the suspension on each side of the vehicle 10 is either compressed or extended depending on the roll direction. The values $Z_L^S$ and $Z_R^S$ are the suspension deflection distances along the vertical direction between the vehicle body 16 and the centers of the left wheel 12 and the right wheel 14, respectively. Compression and expansion of the wheels 12 and 14 also occurs under a roll motion. The values $Z_L^T$ and $Z_R^T$ are tire compression and expansion distances along the vertical direction between the centers of the left wheel 12 and the right wheel 14, respectively.

It is known in the art to measure the displacement of the vehicle body 16 relative to the wheels 12 and 14 using suspension sensors. Depending on the sensor type, a suspension sensor 20 measures the suspension deflection or deflection rate of the suspension at the left wheel 12 and a suspension sensor 22 measures the suspension deflection or deflection rate at the right wheel 14. If the sensors 20 and 22 are rate or velocity sensors, the output of the sensors 20 and 22 are changes in the deflection distances as deflection rate values $\dot{Z}_L^S$ and $\dot{Z}_R^S$.

Figure 2:
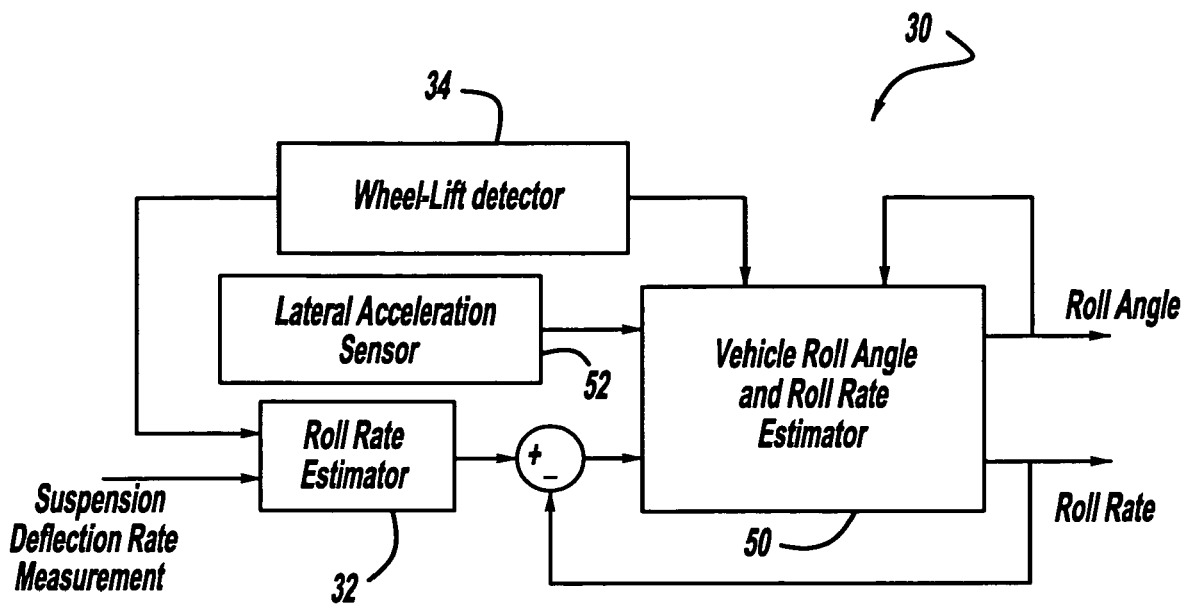
FIG. 2 is a block diagram of a system for estimating vehicle roll rate and roll angle, according to an embodiment of the present invention.

FIG. 2 is a block diagram of a system 30 for estimating the roll angle and roll rate of the vehicle 10. The system 30 includes a roll rate estimator 32 that receives the deflection rate values $\dot{Z}_L^S$ and $\dot{Z}_R^S$ from the sensors 20 and 22. When both of the left and right wheels 12 and 14 are in contact with the ground where no wheel lift is occurring, the vehicle roll rate $\dot{\phi}_s$ can be calculated from the tire and suspension deflection rate values $\dot{Z}_L^S$, $\dot{Z}_R^S$, $\dot{Z}_L^T$ and $\dot{Z}_R^T$ using the kinematic relationship:

$$\dot{\phi}_s = \frac{(\dot{Z}_L^S + \dot{Z}_L^T) - (\dot{Z}_R^S + \dot{Z}_R^T)}{T} \quad (1)$$

Where T is the vehicle track width between the wheels 12 and 14. The vehicle roll rate $\dot{\phi}_s$ can be calculated using equation (1) for both the front wheels and the rear wheels.

The deflection rate values $\dot{Z}_L^S$ and $\dot{Z}_R^S$ are not directly available because the springs and shock absorbers are not installed directly above the wheels 12 and 14. In addition, deflection rates from the suspension system do not necessarily correspond to the deflection rate values $\dot{Z}_L^S$ and $\dot{Z}_R^S$ due to suspension kinematics. Therefore, the measured deflection rates from the deflection sensors 20 and 22 should be converted to vertical deflection rates at the wheel using the equation:

$$\dot{Z}^S = f_1(\dot{Z}_{sus}) \quad (2)$$

Where $\dot{Z}^S$ represents a vertical deflection rate at the wheel and $f_1$ is a function of the measured deflection rate $\dot{Z}_{sus}$ from the suspension system, which can be derived experimentally. For a typical SUV, the function $f_1$ has the following relationship to $\dot{Z}_{sus}$:

$$f_1 = c_1 \dot{Z}_{sus} \quad (3)$$

Where $c_1$ is a vehicle dependent parameter, for example, 1.7857 for the front wheels of the vehicle 10 and 1.2501 for the rear wheels of the vehicle 10.

Because the tire deflection rate values $\dot{Z}_L^T$ and $\dot{Z}_R^T$ are also not directly measurable, they are estimated from the deflection rate values $\dot{Z}_L^S$ and $\dot{Z}_R^S$. Assuming that the unsprung mass effect is negligible, the tire deflection rate values $\dot{Z}_L^T$ and $\dot{Z}_R^T$ can be estimated as:

$$\dot{Z}^T = c_2 \dot{Z}^S \quad (4)$$

Where $c_2$ is a vehicle dependent parameter, for example, $c_2$ can be 0.1391 for the front wheels of the vehicle 10 and $c_2$ can be 0.1530 for the rear wheels of the vehicle 10 for a typical SUV. The value $C_2$ may change slightly with the vehicle loading conditions.

As mentioned above, equation (1) is valid only when both of the left and right wheels contact the ground without any wheel lift. However, even when wheel lift occurs on one side, the roll rate can still be estimated from the suspension deflection rate at the other side because the suspension of the other side is still being compressed. Particularly, when wheel lift occurs on one side of the vehicle 10, the roll rate can be estimated from only the other side of the vehicle as:

$$\dot{\phi}_s = c_3(\dot{Z}_R^S + \dot{Z}_R^T) \quad (5)$$

$$\dot{\phi}_s = c_4(\dot{Z}_L^S + \dot{Z}_L^T) \quad (6)$$

Where $c_3$ and $c_4$ are vehicle dependent parameters. For a typical SUV, $c_3$ can be −0.6667 for the front wheels of the vehicle 10 and −0.6366 for the rear wheels of the vehicle 10, and $c_4$ can be 0.6667 for the front wheels of the vehicle 10 and 0.6366 for the rear wheels of the vehicle 10.

In order to determine whether wheel lift is occurring, the system 10 includes a wheel lift detector 34. Any suitable wheel lift detector can be used for this purpose, and many wheel lift detectors are known in the art for detecting wheel lift.

From equations (1), (5) or (6), depending on whether wheel lift is occurring, two roll rate values $\dot{\phi}_{s,front}$ and $\dot{\phi}_{s,rear}$ are calculated, one for the front wheels and one for the rear wheels of the vehicle 10. The vehicle body roll rate $\dot{\phi}_s$ at the center of gravity of the vehicle 10 can then be calculated as:

$$\dot{\phi}_s = a\dot{\phi}_{s,front} + b\dot{\phi}_{s,rear} \quad (7)$$

Where a and b are vehicle dependent weighting factors. The weighting factors a and b vary according to the center of gravity location of the vehicle and wheel lift conditions. For a typical SUV, the values in Table I below can be used for the factors a and b.

TABLE I

| | No Wheel-Lift | Front-Wheel-Lift | Rear-Wheel-Lift | Two-Wheel-Lift |
|---|---|---|---|---|
| a | 0.5653 | 0.2827 | 0.8826 | 0.5653 |
| b | 0.6347 | 0.9173 | 0.3174 | 0.6347 |

Figure 3:
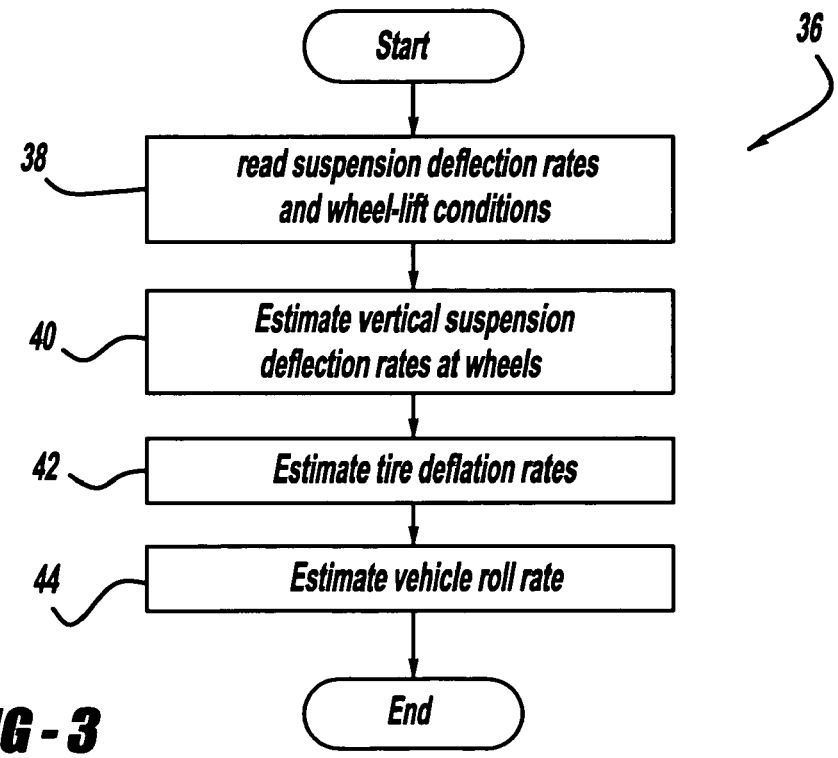
FIG. 3 is a flow chart diagram showing a process for calculating vehicle body roll rate from measured suspension deflection rates.

FIG. 3 is a flow chart diagram 36 showing a process for estimating the vehicle roll rate by the estimator 32, according to the invention. The algorithm reads the suspension deflection rates from the sensors 20 and 22 and the wheel lift condition from the wheel lift detector 34 at box 38. The algorithm then estimates the vertical suspension deflection rates at the wheels 12 and 14 to provide the deflection rate values $\dot{Z}_L^S$ and $\dot{Z}_R^S$ at box 40. The algorithm then estimates the tire deflection rates to provide the values $\dot{Z}_L^T$ and $\dot{Z}_R^T$ at box 42. The algorithm then estimates the vehicle roll rate $\dot{\phi}_s$ using equations (1)-(7), as discussed above at box 44.

As discussed above, the sensors 20 and 22 are velocity sensors for measuring the change in the deflection rate values $Z_L^S$ and $Z_R^S$. In an alternate embodiment, the sensors 20 and 22 can be displacement sensors that only measure the actual distance the suspension is deflected. In that embodiment, the roll rate estimator 32 would be replaced with a roll angle estimator that converts the displacement values from the sensors to roll angle values.

The roll rate estimation based on suspension deflection rates is accurate with good sensor measurements, but can be easily degraded by measurement noise. The measurements from suspension systems suffer from suspension noise and are also sensitive to road disturbances. In order to alleviate this problem, the roll rate estimate can be integrated with a 1 degree-of-freedom dynamic model of vehicle roll motion using the following equation:

$$(I_{xx} + M_s h^2)\ddot{\phi} + b_r \dot{\phi} + k_r \phi = M_s h a_{y,m} \quad (8)$$

Where $I_{xx}$ is the roll moment of inertia of the vehicle body 16 (sprung mass) with respect to the center of gravity, $M_s$ is the mass of the vehicle body 16, h is the height of the center of gravity of the body 16 from the roll center, $\ddot{\phi}$ is roll acceleration, $b_r$ is the roll damping coefficient, $k_r$ is roll stiffness, and $a_{y,m}$ is the lateral acceleration of the vehicle 10.

The system 30 includes a vehicle roll angle and roll rate estimator 50 that uses the 1 degree-of-freedom model to refine the estimated roll rate from the estimator 32 and estimate the roll angle that is substantially free of sensor noise and road disturbances, according to the invention. The estimator 50 also receives the wheel lift signal from the wheel lift detector 34 and receives a lateral acceleration signal from a lateral acceleration sensor 52. A roll angle estimate signal from the estimator 50 is returned to the estimator 50 to provide the calculation therein and a roll rate estimation signal from the estimator 50 is subtracted from the roll rate estimation from the estimator 32 before being input to the estimator 50 to provide a roll rate estimate error signal. If suspension displacement sensors are used instead of suspension rate sensors, a roll angle estimation signal from the estimator 50 is subtracted from the roll angle estimation from the estimator 32 before being sent to the estimator 50 to provide a roll angle estimate error signal.

Equation (8) is a well known relationship than can be used to estimate vehicle roll angle and roll rate. Particularly, the dynamic model shown by equation (8) includes certain factors that allow one skilled in the art to estimate vehicle roll angle and roll rate using the estimator 50. Because the estimated roll rate from the estimator 32 is provided to the estimator 50, the estimated roll rate can be refined by equation (8) and the roll angle can be estimated. From equation (8), the estimated roll rate from the suspension deflection rates is used as a feedback to estimate the vehicle roll angle and roll rate more precisely. The estimator 50 can be constructed using a Kalman filter or traditional Luenberger type observer, well known to those skilled in the art.

Typically, the Kalman filter and Luenberger type observer use a linear observer gain to calculate roll angle and roll rate. Therefore, the estimator becomes less accurate at large roll angles because the calculations assume a linear system. Particularly, just before wheel lift and during wheel lift, the vehicle 10 becomes substantially non-linear. In addition, the estimated roll rate from the suspension deflection rates become less accurate after wheel lift at large roll angles. Therefore, the estimated roll angle and roll rate will become less robust due to non-linearity at large roll angles.

According to the invention, to account for the non-linearity in the system, an observer gain in the estimator 50 is adjusted by the equation:

$$K_e = k_1 k_2 K_{e0} \qquad (9)$$

Where $K_e$ is the adjusted observer gain, $K_{e0}$ is the nominal Kalman filter gain using equation (8), $k_1$ is a non-linearity adjusting factor and $k_2$ is a wheel lift condition adjusting factor. The value $k_1$ is vehicle dependent and varies with the estimated roll angle.

For a typical SUV, the values in Table II below can be used for $k_1$.

TABLE II

| Roll Angle | −8.4 | −7.3 | −6.2 | −5.1 | 5.1 | 6.2 | 7.3 | 8.4 |
|---|---|---|---|---|---|---|---|---|
| $k_1$ | 1.0 | 1.5 | 2.0 | 1.0 | 1.0 | 2.0 | 1.5 | 1.0 |

The value $k_2$ is a vehicle dependent parameter and can be derived from Table III below for a typical SUV.

TABLE III

| | No Wheel-Lift | Front-Wheel-Lift | Rear-Wheel-Lift | Two-Wheel-Lift |
|---|---|---|---|---|
| $k_2$ | 1.0 | 0.6 | 0.6 | 0.4 |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for estimating vehicle roll rate and roll angle of a vehicle, said system comprising:
    a suspension deflection sensor provided at each wheel of the vehicle, said suspension deflection sensors providing suspension measurement signals indicative of the roll of the vehicle;
    a roll rate estimator responsive to the suspension deflection measurement signals, said roll rate estimator estimating the vehicle roll rate based on the suspension measurement signals and estimated tire deflection rates of the wheels and providing a roll rate estimation signal; and
    a vehicle roll angle and roll rate estimator responsive to the roll rate estimation signal, said roll angle and roll rate estimator using a dynamic model to estimate the roll angle and refine the roll rate estimation signal.

2. The system according to claim 1 wherein the roll angle and roll rate estimator uses a Kalman filter.

3. The system according to claim 1 wherein the roll angle and roll rate estimator uses a Luenberger type observer.

4. The system according to claim 1 wherein the roll rate estimator calculates the roll rate estimation signal in a first manner if none of the vehicle wheels are off of the ground and calculates the roll rate estimation signal in a second manner different than the first manner if any of the vehicle wheels are off of the ground.

5. The system according to claim 1 wherein the roll angle and roll rate estimator adjusts an observer gain in the dynamic model with a roll angle non-linearity factor and a wheel lift condition factor to correct for system non-linearities.

6. The system according to claim 1 wherein the roll rate estimator estimates the roll rate for two of the wheels using the equation:

$$\dot{\phi}_s = \frac{(\dot{Z}_L^S + \dot{Z}_L^T) - (\dot{Z}_R^S + \dot{Z}_R^T)}{T}$$

where $\dot{\phi}_s$ is the estimated roll rate, $\dot{Z}_L^S$ is a deflection rate value for a left wheel from one of the suspension sensors, $\dot{Z}_R^S$ is a deflection rate value for a right wheel from one of the suspension sensors, $\dot{Z}_L^T$ is a tire deflection rate for the left wheel, $\dot{Z}_R^T$ is a tire deflection rate for the right wheel and T is the track distance between the left and right wheels.

7. The system according to claim 6 wherein the deflection rate values from the suspension sensors are converted to vertical deflection rates using the equation:

$$\dot{Z}^S = f_1(\dot{Z}_{SUS})$$

prior to the roll angle being calculated, where $\dot{Z}^S$ is a vertical deflection rate at the wheel and the value $f_1$ is a function of the measured deflection rate $\dot{Z}_{SUS}$.

8. The system according to claim 6 wherein the tire deflection rates are estimated from the deflection rate values by the equation:

$$\dot{Z}^T = c_2 \dot{Z}^S$$

where $\dot{Z}^T$ is the tire deflection rate, $\dot{Z}^S$ is the deflection rate value and $c_2$ is a vehicle dependent parameter.

9. The system according to claim 1 where the roll rate estimator estimates the roll rate for two of the wheels using the equation:

$$\dot{\phi}_S = c_3(\dot{Z}_R^S + \dot{Z}_R^T)$$

when wheel lift is occurring, where $\dot{\phi}_S$ is the estimated roll rate, $\dot{Z}_R^S$ is a deflection rate value for one wheel, $\dot{Z}_R^T$ is a tire deflection rate for the one wheel, and $c_3$ is the vehicle dependent parameter.

10. The system according to claim 1 wherein the suspension sensors are velocity sensors.

11. The system according to claim 1 wherein the suspension sensors are displacement sensors.

12. A system for estimating vehicle roll rate and a roll angle of a vehicle, said system comprising:
a suspension deflection rate sensor provided at each wheel of the vehicle, said suspension deflection rate sensors providing suspension deflection rate signals indicative of the roll of the vehicle;
a roll rate estimator responsive to the suspension deflection rate signals, said roll rate estimator estimating the vehicle roll rate based on the suspension rate signals and estimated tire deflection rates of the wheels, and providing a roll rate estimation signal, said roll rate estimator calculating the roll rate estimation signal in a first manner if none of the vehicle wheels are off the ground and calculates the roll rate estimation signal in a second manner different than the first manner if any of the vehicle wheels are off the ground; and
a roll angle and roll rate estimator responsive to the roll rate estimation signal, said roll angle and roll rate estimator using a dynamic model to estimate the roll angle and refine the estimate roll rate signal, said roll angle and roll rate estimator adjusting an observer gain in the dynamic model with a roll angle non-linearity factor and wheel lift condition factor to correct for system non-linearities.

13. The system according to claim 12 wherein the roll angle and roll rate estimator uses a Kalman filter.

14. The system according to claim 12 wherein the roll angle and roll rate estimator uses a Luenberger type observer.

15. The system according to claim 12 wherein the roll rate estimator estimates the roll rate for two of the wheels using the equation:

$$\dot{\phi}_S = \frac{(\dot{Z}_L^S + \dot{Z}_L^T) - (\dot{Z}_R^S + \dot{Z}_R^T)}{T}$$

where $\dot{\phi}_S$ is the estimated roll rate, $\dot{Z}_L^S$ is a deflection rate value for a left wheel from one of the suspension sensors, $\dot{Z}_R^S$ is a deflection rate value for a right wheel from one of the suspension sensors, $\dot{Z}_L^T$ is a tire deflection rate for the left wheel, $\dot{Z}_R^T$ is a tire deflection rate for the right wheel and T is the track distance between the left and right wheels.

16. The system according to claim 12 where the roll rate estimator estimates the roll rate for two of the wheels using the equation:
$\dot{\phi}_S = c_3(\dot{Z}_R^S + \dot{Z}_R^T)$
when wheel lift is occurring, where $\dot{\phi}_S$ is the vehicle roll rate, $\dot{Z}_R^S$ is a deflection rate value for one wheel, $\dot{Z}_R^T$ is a tire deflection rate for the one wheel, and $c_3$ is the vehicle dependent parameter.

17. A method for estimating estimated roll rate and roll angle of a vehicle, said method comprising:
measuring the deflection rate of a vehicle suspension at each wheel of the vehicle;
estimating a roll rate of the vehicle using the suspension rate measurements and estimated tire deflection rates of the vehicle wheels; and
estimating the roll angle and refining the roll rate estimation using a 1 degree-of-freedom dynamic model.

18. The method according to claim 17 wherein estimating the roll rate includes estimating the roll rate in a first manner if none of the vehicle wheels are off the ground and estimating the roll rate in a second manner different than the first manner if any of the vehicle wheels are off the ground.

19. The method according to claim 17 wherein estimating the roll angle and refining the roll rate estimation includes adjusting an observer gain in the dynamic model with a roll angle non-linearity factor and a wheel lift condition factor to correct for system non-linearities.

20. The method according to claim 17 wherein the 1 degree-of-freedom dynamic model is a Kalman filter model or a Luenberg type observer.

* * * * *